United States Patent Office 3,705,054
Patented Dec. 5, 1972

3,705,054
METHOD OF APPLYING COATINGS OF TIN OXIDE UPON SUBSTRATES
Toru Matsushita, Yokohama-shi, Kunimoto Suzuki, Tokyo, and Shoji Hasegawa, Yokohama-shi, Japan, assignors to Tokyo Shibaura Electric Co., Ltd., Kawasaki-shi, Japan
No Drawing. Filed Jan. 18, 1968, Ser. No. 698,688
Claims priority, application Japan, Jan. 25, 1967, 42/4,540
Int. Cl. C03c 17/22
U.S. Cl. 117—211                                1 Claim

ABSTRACT OF THE DISCLOSURE

An organic stannous compound in which divalent tin is bonded to organic radicals by the aid of oxygen such as stannous alkoxide or stannous acyl compound represented by a general formula $Sn(OR)_2$ or $Sn(OOCR)_2$ (R in the formulas represents an alkyl radical) is applied upon a substrate and then the applied coating is pyrolyzed.

This invention relates to a method of applying electroconductive tin oxide coatings upon substrates.

Previous methods of applying tin oxide coatings on substrates can be classified into the following categories.

(I) The spray method

According to this method an aqueous solution of stannic chloride $SnCl_4$ is sprayed upon a substrate heated to an elevated temperature and then the applied stannic chloride is pyrolyzed to form a coating of tin oxide $SnO_2$. While this method has been used most widely, vapour of HCl generated by pyrolysis is not only harmful to the operator but also tends to corrode metallic parts so that sufficient ventilation is required. In addition, this method can not form a uniform coating on the desired portion alone of a substrate of any configuration. As a result, where it is desired to form a coating only on a particular portion it is necessary to apply the tin oxide coating over the entire surface of the substrate and then remove undesired portions of the coating by troublesome means such as grinding.

(II) The evaporation method

According to this method vapour of a volatile organic tin compound such as trimethyl tin chloride, trimethyl tin hydroxide, tripropyl tin chloride, bis-tributyl tin oxide, dibutyl tin dilaurate, triphenyl tin chloride or dimethyl tin dichloride is pyrolyzed by contacting the vapour with a substrate heated to an elevated temperature to produce a coating of tin oxide. This method, however, is disadvantageous in that the vapour of organic tin compounds is deadly poisonous, that it is difficult to form a uniform coating on a substrate of any desired configuration, and that it is also difficult to form the coating only on particular portions.

(III) The hot dipping method

According to this method a substrate heated to an elevated temperature is quickly dipped in an alcohol solution or melt of stannic chloride $SnCl_4$ whereby to pyrolyze it to form a coating of tin oxide. This method is also inadvantageous in that it is necessary to use the substrate that is durable to heat shock and that it is not only difficult to control the thickness of the coating to the desired valve but also to limit the coating to particular portions.

(IV) The cold dipping method

This method is also known as the dipping method and involves the steps of applying a tin compound upon a substrate by painting, dipping, spraying or the like and then the coated substrate is heated to an elevated temperature to effect pyrolysis thus forming a coating of tin oxide. This method enables to selectively form coatings on selected portions alone of a substrate of complicated configuration by masking it by printing or brushing a substance capable of volatilising upon pyrolysis. However, until now any suitable tin compound is not yet available to provide uniform coatings of tin oxide. For this reason this method has not been used commercially.

It is therefore an object of this invention to tliminate the above mentioned defects of prior methods.

A further object of this invention is to provide a method which can produce transparent and uniform coating of tin oxide by employing an organic stannous compound in which divalent tin is bonded to organic radicals by the aid of oxygen, such as $Sn(OR)_2$ or $Sn(OOCR)_2$ (R in the formulas represents an alkyl radical).

According to this invention there is provided a method of applying a tin oxide coating on a substrate comprising the stops of applying an organic stannous compound in which divalent tin is bonded to organic radical by the aid of oxygen such as a stannous alkoxide or stannous acyl compound represented by a general formula $Sn(OR)_2$ or $Sn(OOCR)_2$. As $Sn(OR)_2$ may be used stannous octyloxide stannous decyloxide, stannous hexyloxide and stannous pentyloxide while as $Sn(OOCR)_2$ may be used stannous caproate.

Although compounds represented by $Sn(OR)_2$ and $Sn(OOCR)_2$ as employed in this invention are readily soluble in almost all organic solvents where lower alcohols of high water contents such as methanol $CH_3OH$ or ethanol $C_2H_5OH$ are used as solvent during storing over a long time the solution tends to become muddy due to hydrolysis of $Sn(OR)_2$ or $Sn(OOCR)_2$.

Therefore, it is advantageous to dissolve $Sn(OR)_2$ in a suitable organic solvent of low water contents so that after applying the solution on the substrate, the applied coating is dried at a temperature ranging from 100 to 250° C. to obtain a transparent film manifesting interference colours. At this state, as the coating has not yet been completely converted to $SnO_2$ the coating is further heated to a temperature ranging from 300 to 400° C. to pyrolyze or oxidise the remaining organic substance whereby pyrolyzed or oxidised products are evaporated off in the form of water or carbon dioxide gas or the like to obtain a coating of $SnO_2$ on the substrate. The coating of tin oxide $SnO_2$ thus obtained has somewhat low mechanical strength and a surface resistivity of from 200 kilo-ohms to 1 megohms per square. Upon further heating the coating to a temperature of more than 500° C., the mechanical strength of the coating increases and its surface resistivity changes to a value of about 50 to 100 kilo-ohms per square.

Although the mechanism of forming strong tin oxide coatings by the pyrolysis of organic stannous compounds wherein divalent tin is bonded to organic radicals by the aid of oxygen such as $Sn(OR)_2$ or $Sn(OOCR)_2$ is not yet clearly understood, it may be considered that during the drying step at a temperature of from 100° C. to 250° C. $Sn(OR)_2$ is converted to $SnO(OR)_2$ and $Sn(OOCR)_2$ to $SnO(OOCR)_2$ by oxydation while at the same time they are hydrolyzed by the moisture in air to form Sn—O—Sn linkage thus forming coatings manifesting interference colours and that the organic substances pyrolyze by the heating of 300 to 400° C. whereby to form strong tin oxide coatings.

Other organic tin compounds than the particular organic tin compounds such as $Sn(OR)_2$ and $Sn(OOCR)_2$ wherein divalent tin is bonded to organic radicals by the aid of oxygen cannot provide transparent tin oxide $SnO_2$ coatings. Among these organic tin compounds are included, for example, dibutyl tin-diacetate $(C_4H_9)_2Sn(CH_3COO)_2$, dibutyl tin dilaurate $$(C_4H_9)_2Sn(C_{11}H_{23}COO)_2$$

dibutyl tinoctylmaleate $$(C_4H_9)_2Sn(C_8H_{17}OOCCHCHCOO)_2$$

dimethyl tindichloride $(CH_3)_2SnCl_2$, dibutyl tinmaleate $(C_4H_9)_2SnC_4H_2O_4$, etc. When these organic tin compounds are dissolved in organic solvents such as alcohols, ethers or the like and as the coatings on the substrates produced therefrom are dried they become muddy and do not yield transparent $SnO_2$ coatings when heated to temperature exceeding 500° C. Such organic tin compounds as tetrabutyl tin $(C_4H_9)_4Sn$ and tributyl tinchloride $(C_4H_9)_3SnCl$ are vapourised in the form of organic compounds when they are heated to 500° C., thus leaving little tin oxide $SnO_2$ on the substrate. Further, dibutyl tin oxide $(C_4H_9)_2SnO$ and dioctyl tin oxide $(C_8H_{17})_2SnO$ are difficult to dissolve in both inorganic and organic solvent so that they are difficult to be applied onto the substrate. Solution of other inorganic tin compounds cannot form uniform coatings even though $SnO_2$ remains on the substrate when the solution is applied thereto and heated.

The tin oxide coatings produced in accordance with the method of this invention can be used as transparent resistance films, electroconductive films or prime coatings for chemical platings in order to increase their stripping strength of plating. Further it is possible to form tin oxide coatings on the selected portions alone of the substrates by applying the solution of $Sn(OR)_2$ or $Sn(OOCR)_2$ to such portions, drying and then heating the coatings at a temperature above 300° C.

This invention will be understood more clearly with reference to the examples which follow. However, it should be understood that they are offered only by way of illustration and are not intended to define the breadth of the invention or limit the scope of the claims.

EXAMPLE 1

A soda lime glass substrate having an area of 20 mm. x 30 mm. was dipped in a solution prepared by dissolving 15 grams of stannous octyloxide $Sn(OC_8H_{17})_2$ in 85 grams of butanol $C_4H_9OH$. After removing from the solution the substrate was dried at a temperature of 150° C. for 10 minutes and then heated to a temperature of 400° C. for 30 minutes whereby a transparent tin oxide coating having interference colours was formed on the glass substrate. The surface resistivity of the tin oxide coating was 200 kilo-ohms per square.

EXAMPLE 2

A solution prepared by simultaneously dissolving 4 grams of stannous decyloxide $Sn(OC_{10}H_{21})_2$, 4 grams of stannous octyloxide $(SnOC_8H_{17})_2$ and 4 grams of stannous pentyloxide $Sn(OC_5H_{11})_2$ in 88 grams of isopropyl alcohol $C_3H_7OH$ was applied to a fused silica plate having an area of 20 mm. x 30 mm. by means of a brush, dried at a temperature of 150° C. for 20 minutes, and heated to 700° C. for 30 minutes whereby a transparent tin oxide coating having interference colours was obtained which had a specific resistance of 50 kilo-ohms per square.

EXAMPLE 3

A solution prepared by dissolving 10 grams of stannous hexyloxide $Sn(OC_6H_{13})_2$ in 90 grams of octyl alcohol $C_8H_{17}OH$ and the solution was sprayed onto a rod of alumina ceramic having a length of 30 mm. and a diameter of 7 mm., dried at a temperature of 180° C. for 10 minutes, and heated to a temperature of 600° C. for 30 minutes, thus obtaining a transparent tin oxide coating on the surface of the rod. The surface resistivity of the coating was 80 kilo-ohms per square.

EXAMPLE 4

A rod of a porous mullite ceramic having a diameter of 5 mm. and a length of 30 mm. was dipped in a solution prepared by dissolving 13 grams of stannous octyloxide $Sn(OC_8H_{17})_2$ in 87 grams of kerosene. The rod was then taken out, dried at a temperature of 200° C. for 20 minutes, and heated at a temperature of 700° C. for 30 minutes. After cooling to the room temperature the rod was again dipped in said solution, dried and heated under the same conditions as above described. Silver paste was then applied to the opposite ends of the rod over a length of 5 mm. to form electrodes. The resistance of the portion between electrodes which has a length of 20 mm. was measured to be 30 kilo-ohms.

EXAMPLE 5

A solution prepared by dissolving 9 grams of stannous caproate $Sn(OOCC_5H_{11})_2$ in 60 grams of hexylalcohol $C_6H_{13}OH$ and a solution prepared by dissolving 1 gram of cellulose acetate in 30 grams of amyl acetate $$CH_3COOC_5H_{11}$$

were mixed together. The mixture was brushed onto the surface of a borosilicate glass plate having an area of 20 mm. x 30 mm., dried at a temperature of 150° C. for 15 minutes and then heated at a temperature of 650° C. for 30 minutes to obtain a transparent tin oxide coating having a surface resistivity of 100 kilo-ohms per square.

What is claimed is:

1. A method of applying a tin oxide on a substrate comprising the steps of applying a material selected from the group consisting of stannous octyloxide, stannous decyloxide, stannous hexyloxide and stannous pentyloxide on the surface of the substrate, drying the applied coating at a temperature of 150° C. to 250° C. to obtain a transparent film and then pyrolyzing said film at a temperature of 400° C. to 700° C.

References Cited

UNITED STATES PATENTS

| | | | |
|---|---|---|---|
| 2,566,346 | 9/1951 | Lytle et al. | 117—124 UX |
| 3,004,863 | 10/1961 | Gray et al. | 117—124 UX |
| 3,337,391 | 8/1967 | Clayton et al. | 117—124 X |
| 3,368,915 | 2/1968 | Carl et al. | 117—124 X |
| 3,407,085 | 10/1968 | Kitaj et al. | 117—124 X |
| 3,425,859 | 2/1969 | Steigelman | 117—124 X |

ALFRED L. LEAVITT, Primary Examiner

J. R. BATTEN, Jr., Assistant Examiner

U.S. Cl. X.R.

117—124 A, 229